United States Patent [19]
Peterson

[11] 3,884,520
[45] May 20, 1975

[54] DRIVE MECHANISM FOR COLLAPSIBLE CAMPING VEHICLES

[75] Inventor: Wilbur E. Peterson, Harmony, Minn.

[73] Assignee: Harmony Enterprises, Inc., Harmony, Minn.

[22] Filed: Sept. 25, 1973

[21] Appl. No.: 400,624

[52] U.S. Cl. .................... 296/27; 52/67; 74/29; 296/23 R
[51] Int. Cl. ............................................. B60p 3/34
[58] Field of Search ........ 296/27, 23 R, 23 A, 23 C, 296/23 F, 26, 137 G; 52/66, 67; 74/29, 422; 214/730

[56] References Cited
UNITED STATES PATENTS

| | | | |
|---|---|---|---|
| 1,125,809 | 1/1915 | Buker | 74/422 |
| 3,456,978 | 7/1969 | Daniels | 296/27 |
| 3,558,181 | 1/1971 | Peterson | 52/66 |
| 3,716,158 | 2/1973 | Hansen | 214/730 |

*Primary Examiner*—Robert J. Spar
*Assistant Examiner*—Gary Auton
*Attorney, Agent, or Firm*—Merchant, Gould, Smith & Edell

[57] ABSTRACT

A drive mechanism for outwardly extending the sides and raising the roof of a collapsible camping vehicle. A pair of oppositely extendable wind members are slidably mounted on rails attached to the base of the vehicle. Along one rail, a common drive pinion engages racks on both wing members for simultaneously driving them in opposite directions. A pair of rods are mounted perpendicular to the rails near the ends thereof, and have pinions which engage racks on the wing members. Drive force applied to the wing members by the drive pinion along one rail is thereby transferred to the other rail so as to prevent jamming or binding of the wing members in the rails.

4 Claims, 7 Drawing Figures

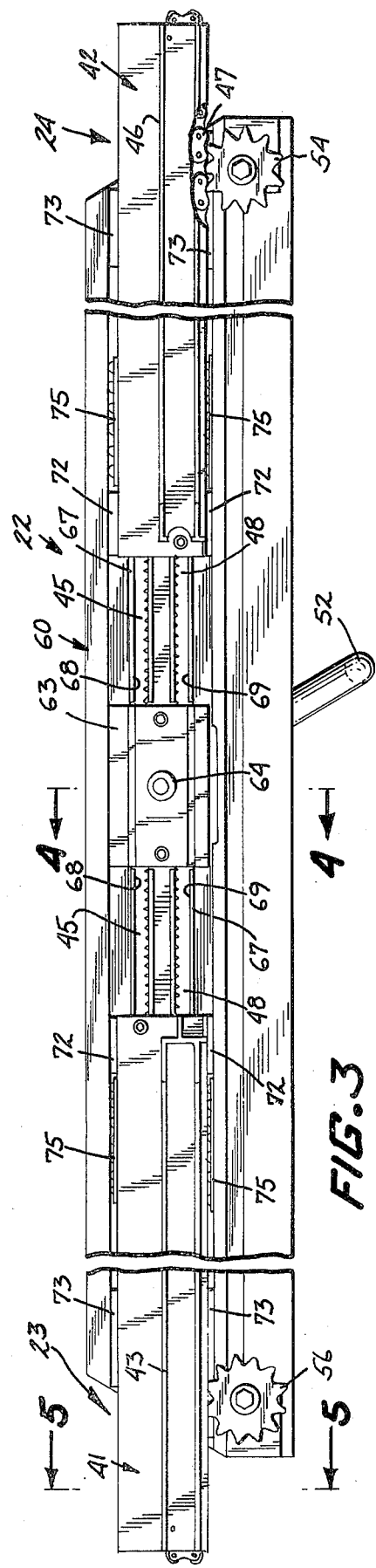
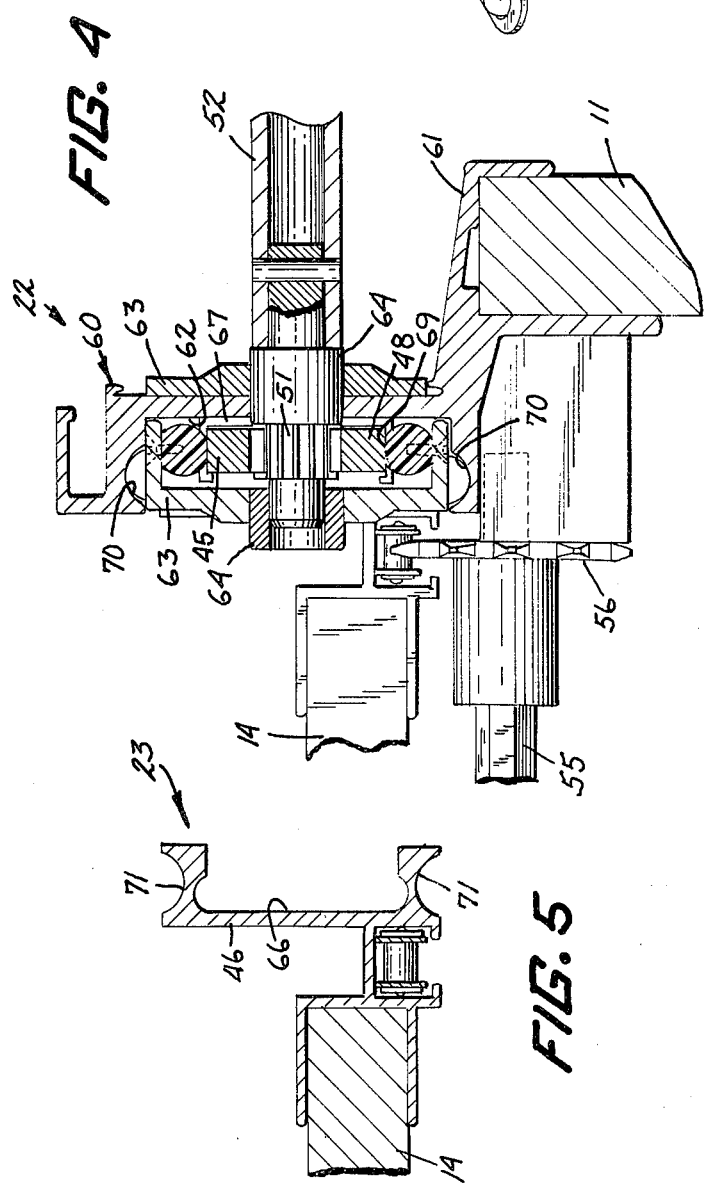
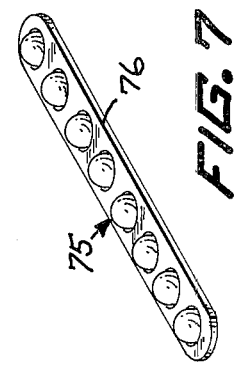

DRIVE MECHANISM FOR COLLAPSIBLE CAMPING VEHICLES

BACKGROUND OF THE INVENTION

The present invention relates generally to the field of drive mechanisms for erecting collapsible structures. More particularly, the present invention is especially adapted to collapsible camper vehicles which are folded into a collapsed compact unit for transportation, then are erected into an unfolded service configuration for use. As such, the present invention is equally applicable to truck — or car — mounted campers, and to separate camping trailers, and also is equally applicable to campers having flexible tent-like walls, and those having rigid, folding walls.

In recent years there has been a growing popularity of camping vehicles. In particular, collapsible campers have achieved wide-spread popularity. One advantage of a collapsible camper is its ability to provide a spacious area for habitation when erected, and yet to provide a small and compact form for travel or storage. In the most popular general type of collapsible camper, a roof forms the top for a box-like base in the collapsed position. In the service position, a pair of oppositely extendable wing members slide horizontally outward to form beds or sitting areas, etc., while the roof is raised upward to allow head room for occupants. The walls are formed either of a flexible material such as canvas which is then stretched over forms to make a tent-type structure, or alternatively the walls could be made of rigid panels which are hinged and pivoted to travel between the collapsed and service positions. Various mechanisms have been provided for setting up the campers. Some arrangements require two or more individuals to manually pull the wings and lift the roof. Other arrangements have been developed wherein the extending of the wings and raising of the roof can be performed simultaneously and effortlessly by a single operator. In such campers, the drive motion is applied by a crank (or a motor) operating at a single point, and working through a drive mechanism to affect simultaneous extension of the wings and erection of the roof.

One such example of a prior art drive mechanism is disclosed in my earlier U.S. Pat. No. 3,558,181. This patent discloses a collapsible tent trailer in which the wing members are oppositely extended by a drive mechanism actuated by a crank at a single point. Extension of the wing members causes raising of the roof, which is connected to the wings by a plurality of rods pivotally connected to the roof and to the wings. Springs attached to these pivot joints assist in raising the roof. The drive force is applied to a pinion which engages a pair of racks, one above and one below the pinion, which are attached to the two wing members. Driving of the pinion by the crank therefore serves to drive the two wing members apart (or, to pull them together for collapsing the structure). Applying of the drive force at one point has the advantage of allowing one man operation, but it is necessary to provide means for transferring the force applied to the wing members along one rail to the other side of the vehicle, along the other rail, in order to prevent binding or skewing of the wing members in their rails which would otherwise result from the asymmetrical application of drive force thereto. In my aforesaid prior patent, this function is performed by a pulley and cable arrangement.

The present invention, while maintaining the same general type of mechanism for extending the wing members, replaces the pulley and cable arrangement with a pair of rack and pinion drive shafts extending transversely from one rail to the other to transfer the drive motion from one side of a wing member to the other. This improvement provides a more positive mechanism, and has the advantages of lower manufacturing and labor costs, and less need for maintenance than the pulley and cable arrangement of my earlier patent.

SUMMARY OF THE INVENTION

According to the present invention there is provided an improved drive mechanism for extending the wing members and thereby raising the roof of a collapsible structure. A pair of oppositely extendable wing members are slidably mounted on parallel horizontally extending rails. A common drive pinion associated with one rail engages racks associated with each of the wing members for simultaneously driving them in opposite directions. A pair of drive rods mounted to the rails extend transverse thereto. Pinions on each end of the rods engage separate racks on the wing members, to transfer motion imparted along one side of the oppositely extendable wings, to their other sides. A roof mounted to the wing members by pivoted rods is erected by outward motion of the wing members.

BRIEF DESCRIPTION OF THE DRAWINGS

FIG. 3 is a view in elevation of a portion of the drive mechanism, portions thereof being broken away;

FIG. 4 is a sectional view taken generally along line 4—4 of FIG. 3;

FIG. 5 is a sectional view taken generally along line 5—5 of FIG. 3;

FIG. 7 is a view in perspective of a ball bearing insert.

DESCRIPTION OF THE PREFERRED EMBODIMENT

Figure 1:
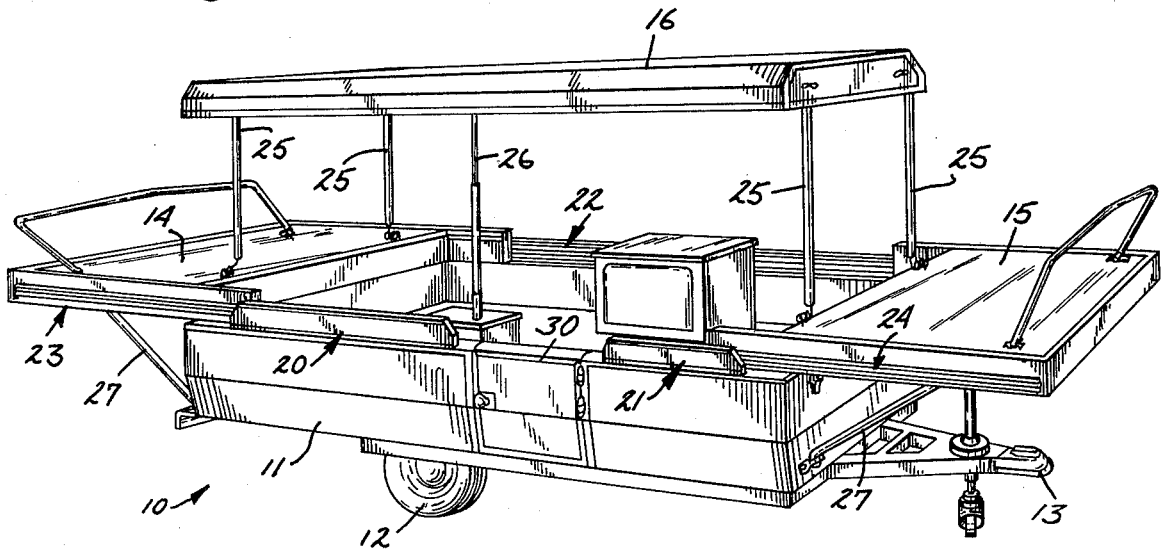
FIG. 1 is a view in perspective of a camper trailer incorporating the drive mechanism of the present invention.
Figure 6:
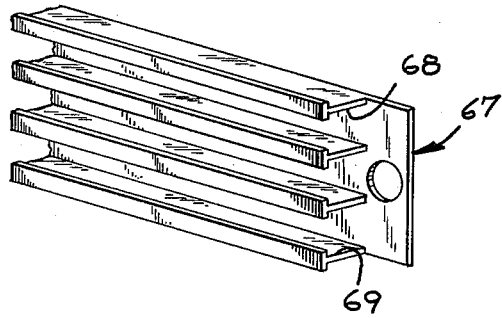
FIG. 6 is a view in perspective of a portion of the rail shown in FIGS. 1 and 3.

In FIG. 1, reference numeral 10 generally designates a camper trailer incorporating the present invention. Camper trailer 10 comprises a base 11, having wheels 12 and a draw bar 13. A roof 16, shown in its erected position, also serves as a cap for the base 11 when it is in its collapsed position. Reference numerals 14 and 15 generally designate a pair of oppositely extendable wing members, shown in their fully extended positions in FIG. 1. Reference numerals 20, 21, and 22 generally designate rail assemblies which are mounted to base 11. Wing members 14 and 15 have members 23 and 24 attached to their one sides, which mate respectively with rail assemblies 20, 21 and 22 to allow relative horizontal movement. A plurality of rods 25 connect roof 16 to wings 14 and 15. Rods 25 are held by pivotal connections at both ends, so that roof 16 will be raised and lowered respectively as the wings 14, 15 are extended and retracted, in the well-known manner. A telescoping rod 26 serves to maintain proper horizontal orientation of the roof as it is being raised. Support rods 27 are installed between the bottom of base 11 and the underside of wings 14 and 15 when the latter are in their extended positions, in order to increase the overall strength of the structure. Rods 27 may for example be held in place by a socket arrangement, and may be removed prior to retracting of the wings. A doorway 30 in one side of the camper unit necessitates the splitting of the rail assembly on that side into two separate units, 20 and 21, whereas the continuous wall on the other side of the camper permits a single continuous rail assembly 22.

Figure 2:
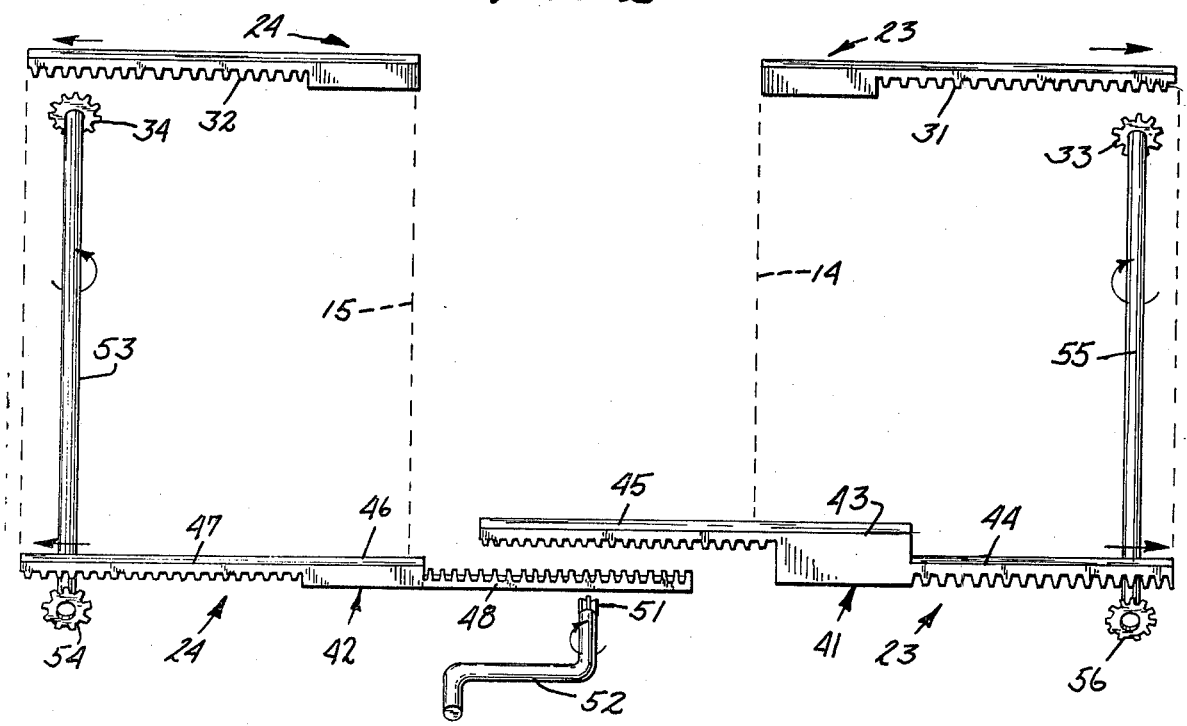
FIG. 2 is a diagrammatic view schematically illustrating the function of the drive mechanism according to the present invention.

In FIG. 2, reference numerals 14 and 15 again represent the wing members of FIG. 1, which are shown schematically in FIG. 2. In FIGS. 1 and 2, the member 23 which is attached to the side of wing 14, and which slidably engages rail assembly 20, includes a rack portion 31 along its bottom side. Similarly, member 24 which is attached to the side of wing 15 and which slidably engages rail assembly 21 also includes a rack portion 32. These rack portions 31, 32 are engaged respectively by pinions 33 and 34. On the other side of the vehicle, a pair of members generally designated 41 and 42 are attached respectively to the other sides 23, 24 of wings 14 and 15, and slidably engage rail assembly 22. Member 41 comprises a central portion 43 and racks 44 and 45. Similarly, member 42 comprises a central portion 46, and racks 47 and 48. Racks 45 and 48 are vertically disposed and face towards each other. A common drive pinion 51 is positioned between racks 45 and 48 to drivably engage both of them. A crank 52 is attached to common drive pinion 51.

A drive shaft or rod 53 connects to pinion 34. Another pinion 54 is attached to the other end of shaft 53, for engagement with rack 47. Similarly, associated with wing 14, a drive shaft or rod 55 connects to pinion 33. A pinion 56 is attached to the other end of shaft 55, for engagement with rack 44.

FIG. 2 includes a plurality of direction arrows showing rotation and translation of the various components during extension of the wings. Rotation of crank 52 causes members 41 and 42 to simultaneously extend away from each other, by sliding outwardly along rail assembly 22 (of FIG. 1). This outward motion causes racks 44 and 47 to turn pinions 56 and 54, respectively, thereby rotating shafts 55 and 53. The rotation of the shafts couples the motion through pinions 33 and 34 to members 23 and 24, which slide outwardly on rail assemblies 20 and 21, respectively. The drive force applied at the single driving point is thus transmitted uniformly to both sides of the wing assemblies, along both rails, so as to provide symmetrical driving forces. The oppositely extendable wing members 14 and 15 therefore travel smoothly outwardly along the rail assemblies, without twisting or binding.

FIGS. 4–7 more specifically illustrate the rail assembly 22 and members 23, 24 associated therewith. As shown, rail assembly 22 includes an elongated extrusion or rail member 60 having a laterally extended portion 61 shaped to receive the upper edge of the base 11. Member 60 is further shaped to provide an inwardly facing recess 62. Bearing brackets 63 are positioned one within the recess 62 and the other exterior of the rail member 60. Each bracket 63 is disposed centrally between opposite ends of the rail member 60 to provide support for bearing members 64. The bearing brackets 63 and bearings 64 provide rotatable support to the pinion 51.

Plastic inserts 67 are also mounted in the inwardly opening recess 62 to extend from the bearing bracket 63 toward opposite ends of the rail member 60. The plastic inserts 67 each are formed to define inwardly opening upper and lower channels 68, 69 respectively. The upper and lower channels 68, 69 serve to receive and guide one of the racks 45, 48 respectively therein for movements longitudinally of the rail member 60. The channels 68, 69 maintain the rail members 45, 48 in their meshing relationship with the pinion 51.

An extruded member representing the central portions 43, 46 of the members 41, 42 respectively, is received within the recess 62 on opposite sides of the bearing bracket 63. Inner ends of the extrusions 43, 46 are each secured to an adjacent end of a respective rack member 45, 48 for common movement therewith longitudinally of the rail member 60 in response to rotation of the pinion 51. Each of the extrusions 43, 46 is formed with an outwardly opening recess 70. Recess 70 provides proper clearance for the plastic inserts 67 when the extrusions 43, 46 are received within the recess 62, as illustrated in FIG. 4.

For the purpose of guiding the extrusions 43, 46 for movement longitudinally of the rail member 60 the rail 60 and end portions 43, 46 are grooved, as at 70, 71 respectively for the reception of inner and outer bearing members 72, 73. Inner and outer bearings 72, 73 are formed from short cylindrical lengths of suitable plastic material. The inner bearing members 72 are fixedly secured to an inner end of a respective extrusion 43, 46 and the outer bearing members 73 are each secured to an outer end of the extruded member 60, see FIG. 4. In this manner, each of the extruded members 43, 46 is supported for movements within the recess 62 longitudinally of the rail member 60 responsive to movements of the racks 45, 48 by the pinion 51.

Ball bearing inserts 75 are positioned in grooves 70, 71 between each of the inner and outer bearings 72, 73 of the extrusions 43, 46. The bearing inserts 75 prevent binding of the extrusions 43, 46 with the rail member 60 as the wing members 14, 15 move from their inwardly disposed positions to their extended positions of FIG. 1. A keeper 76 on each of the ball bearing inserts 75 maintains the ball bearings 77 in a correctly spaced relationship.

A rack 44, 47 is formed on an inwardly disposed surface of a respective extrusion 43, 46. While the racks 44, 47 are diagrammatically illustrated as gear teeth in FIG. 2, the preferred embodiment of FIGS. 3–5 illustrates short lengths of link or roller chain secured within a downwardly opening channel formed on the inwardly disposed surface of the members 43, 46. Each of these racks or lengths of chain 44, 47 have meshing engagement with a respective pinion gear or sprocket 56, 54. Thus, as above described movement of the central portions or extrusions 43, 46 is transmitted to a respective drive shaft 55, 53 and thence to a respective rack 31, 32 through a respective pinion 33, 34 associated with an opposite member 23, 24 of the wings 14, 15 respectively.

While I have described a specific construction with respect to rail assembly 22 and members 23, 24 associated therewith, it will be understood that rail assemblies 20, 21 are similar to rail assembly 22 with the central portion thereof removed to accommodate the door 30 and that the members 23, 24 associated with rail assemblies 20, 21 are similar with those associated with rail assembly 22 with the exception that the racks 45, 48 have been removed. Therefore, further detailed description of the rail assemblies 20, 21 together with their respective members 23, 24 is eliminated in the interest of brevity.

As disclosed in the foregoing description of the preferred embodiment of my invention, I have provided an improved drive mechanism for outwardly extending the sides and for raising the roof of a collapsible structure. By the use of the two drive shafts which have pinions engaging racks on opposite sides of each wing, the present invention provides a more positive extension of the wings, and is not susceptible to misalignment during extending movements as is the prior art cable and pulley system. Further, the elimination of the cable and pulley system reduces the amount of labor required during manufacture of the mechanism, and eliminates the need for skilled period maintenance which is required in the case of the pulley and cable system, due to gradual stretching of the cables through normal use.

What is claimed is:

1. A drive mechanism for erecting the roof of a collapsible structure between collapsed and service positions, comprising:
   a. a plurality of elongated rails constructed for mounting in a generally horizontal orientation on a base;
   b. oppositely extendable members mated with said rails for allowing limited relative horizontal movement between said rails and said extendable members while preventing relative vertical movement;
   c. a roof member;
   d. a plurality of elongated rods pivotally connected to said roof member and said oppositely extendable members so as to move said roof member into an elevated service position upon outward movement of said oppositely extendable members;
   e. a common drive pinion rotatably positioned within one of said rails and engaging racks on said oppositely extendable members for causing simultaneous movement thereof in opposite directions; and
   f. a pair of shafts mounted between said elongated rails generally perpendicular thereto, each of said shafts having a pinion at each end drivably engaging racks attached to said oppositely extendable members, whereby the motion applied by said common drive pinion to said oppositely extendable members along one rail is transferred by said rods to the oppositely extendable members along the other rails.

2. A drive mechanism for erecting a collapsible camper unit having a box-like base and a roof erectable between collapsed and service positions, comprising:
   a. a first rail assembly mounted generally horizontally along one side of said base;
   b. second and third rail assemblies mounted generally horizontally along the other side of said base parallel to said first rail assembly, said second and third rail assemblies being longitudinally spaced from one another to form a doorway;
   c. a pair of wing members having means for mating with said rail assemblies to allow relative horizontal movement of said wings with respect to said base while preventing relative vertical movement;
   d. a plurality of elongated rods pivotally connected to the roof and to the wing members so as to move the roof into an elevated service position upon opposite outward movement of the wing members;
   e. a common drive pinion rotatably positioned within said first rail assembly;
   f. a first drive shaft mounted between said first and second rail assemblies generally perpendicular thereto, said drive shaft having a pinion at each end;
   g. a second drive shaft mounted between said first and third rail assemblies generally perpendicular thereto, said drive shaft having a pinion at each end;
   h. each of said wing members having racks on their one side engaging said common drive pinion, and further racks on their one side for engaging the pinions of said first and second drive shafts; and
   i. said wing members having racks on their other sides engaging the pinions on said first and second drive shafts, whereby drive motion applied to the one side of said wing members by said common drive pinion is transferred to said other side of said wing members by said drive shafts.

3. Apparatus according to claim 2 further comprising a hand crank removably attached to said common drive pinion.

4. Apparatus according to claim 2 wherein the racks of said wing members engaging the pinions of said drive shafts comprise lengths of link chain attached to said wing members, and wherein said pinions on said first and second drive shafts comprise sprockets for engaging the link chains.

* * * * *